2,789,953

SWEEPING COMPOSITION

Charles Blackman, New York, N. Y.

No Drawing. Application June 5, 1953,
Serial No. 359,954

1 Claim. (Cl. 252—88)

This invention relates to a sweeping compound for highly polished floors, carpets and the like.

Sweeping compounds are used to prevent the dust from rising from the floor and floor covering and they are also used as cleaning agents to pick up and collect the fine dust and other small particles of foreign matter which would otherwise remain undisturbed. Many sweeping compounds are known to the prior art and they are useful in connection with ordinary floors and floor coverings. However, they are known to be abrasive with respect to highly polished floors and fine, expensive floor coverings.

It is the principal object of this invention to provide a sweeping compound which is suitable for use in connection with floors and floor coverings of every description, including the highly polished floors and fine floor coverings above mentioned. The sweeping compound herein described and claimed is entirely free from any and all abrasive materials which might injure highly polished floors and fine floor coverings.

Another important object of this invention is the provision of a sweeping compound which is made, basically, of material that at the present time has no known commercial use and which normally is permitted to go entirely to waste. Consequently, the sweeping compound herein claimed may be made to sell at relatively low prices so as to be within the reach of any and all who would desire to use a sweeping compound. Sweeping compounds are, of course, used only once and they are then discarded as waste. It is extremely important that a product which is used and discarded in this manner should be as inexpensive as it is humanly possible to produce. The sweeping compound herein claimed can be made to sell at a price which is lower by far than the lowest price which is conventionally charged for the least expensive known sweeping compound.

The invention has three important objects, therefore, the first being to provide a sweeping compound which can be used in connection with all floors and floor coverings, including the highly polished floors and fine floor coverings. The second object is to provide a sweeping compound which can be made to sell at a lower price than any other known sweeping compound. The third object is corollary to the second and it provides for making commercial use of material which now goes to waste.

More specifically, the basic ingredient of the sweeping compound herein claimed is comminuted, desiccated tree leaves. Thoroughly dried tree leaves, ground to small particles and saturated with wax or the like, constitute an exceedingly fine, non-abrasive, inexpensive sweeping compound. The stems of the leaves may or may not be used depending upon the ultimate object of the sweeping compound. If it is intended for exceedingly fine floors and the like, it may be found desirable to omit the stems of the leaves from the compound. However, it should be understood that the stems, even when used, provide relatively little, if any, abrasive effect upon conventional floors and floor coverings. For all practical purposes, therefore, entire leaves may be used in connection with this invention.

Fallen leaves are virtually all useful in connection with the compound herein claimed. Nonetheless, oak and maple leaves are preferred. The fallen leaves may be naturally dried in the open air and exposed to the sun or they may be dried by storing them in dry storage for a sufficiently long period of time. Three months is considered to be ample drying time under normal conditions. It is also possible to hasten the drying time and process by subjecting the leaves to heat, as in an oven. The leaves may be subjected or exposed in closed areas to dry, heated air currents.

After the leaves are thoroughly dried, they are ground to number 8 to 12 mesh size, but this is purely illustrative and should not be taken or deemed as limitative of the invention. The precise grinding mechanism is not critical; any conventional grinder capable of grinding dried leaves to form the small particles above mentioned may be employed in connection with this invention.

The sweeping compound herein claimed may be made in the following manner: tree leaves of the character described are collected and dried or they may be found to be completely dry when collected. In either case, they are placed in a conventional grinding machine where they are ground down to small particles of number 8 to 12 mesh size. The ground leaves are now placed in a conventional mixing machine and heated, fluid wax is poured slowly into the mixing machine to be mixed with the ground leaves. When the leaves are thoroughly coated and after they have absorbed the wax, the process is complete and the sweeping compound is ready for use. It is important to note at this point that conventional sweeping mixes generally contain sawdust and perhaps sand and strands or pieces of hemp or jute or other similar fibrous material. These materials, particularly sawdust and sand, do not absorb wax. Consequently they remain relatively hard and abrasive. Comminuted, desiccated tree leaves, on the other hand, tend to absorb the wax and the particles of the leaves become soft and waxy throughout.

Any suitable wax may be used in connection with the sweeping compound herein claimed. It may be of animal or vegetable or mineral origin. Preferably, however, mineral wax should be used, such as paraffin wax with or without any other kinds of wax in combination. Reference is made to paraffin wax from petroleum, ozokerite, ceresin and montan wax. These waxes are normally solid at room temperature and they must be heated to fluidity in order to thoroughly saturate the ground leaves.

The preferred proportions of tree leaves to wax are as follows:

Two pounds of ground and dried tree leaves
One half pound of paraffin wax

These proportions are, however, purely illustrative and some floors may require a greater proportion of wax and other floors may require a greater proportion of dried, ground tree leaves. Broadly speaking, however, one part of wax to four parts of tree leaves, by weight, would very adequately serve the purposes of this invention.

No dye is required in the sweeping compound herein described and claimed. Nonetheless, it may be found desirable to incorporate a harmless inexpensive dye into the mix so that it will all the more readily be seen during use. Normally the mix would have a dark brown color and this is all that would normally be needed but should any other color be desired, the use of a dye will provide whatever color is prescribed.

It may also be found desirable to provide the sweeping compound herein claimed with more weight and greater body than it would normally possess. This might be done by incorporating very fine clay into the mix but care must be taken to avoid the use of any clay that might contain abrasive sand or other particles. A suitable mix in which clay is incorporated may be given as follows:

Two pounds of dried and ground tree leaves
Three-quarters of a pound of paraffin wax
Half a pound of clay The foregoing is illustrative of the basic principles of this invention and it will be understood that the preferred forms herein set forth may be modified and other forms may be had within the broad spirit of the invention and the broad scope of the claim.

I claim:

A sweeping composition consisting essentially of approximately 8 parts by weight of dried, ground, fallen tree leaves, approximately 2 parts by weight of clay and approximately three parts by weight of paraffin wax.

References Cited in the file of this patent

UNITED STATES PATENTS

| | | |
|---|---|---|
| 792,544 | Newman | June 13, 1905 |
| 873,913 | Vernon | Dec. 17, 1907 |
| 939,369 | Wolfgram | Nov. 9, 1909 |
| 1,404,216 | Murray | Jan. 24, 1922 |
| 2,092,686 | Wilson | Sept. 7, 1937 |
| 2,550,631 | Young | Apr. 24, 1951 |